United States Patent
Hwang et al.

(10) Patent No.: US 11,006,389 B2
(45) Date of Patent: May 11, 2021

(54) METHOD AND APPARATUS FOR DETERMINING RADIO LINK FAILURE

(71) Applicant: Samsung Electronics Co., Ltd, Suwon-si (KR)

(72) Inventors: June Hwang, Incheon (KR); Hyunjeong Kang, Seoul (KR); Sangwook Kwon, Suwon-si (KR); Youngjoong Mok, Suwon-si (KR); Jungmin Moon, Suwon-si (KR); Anil Agiwal, Suwon-si (KR); Byounghoon Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/347,511

(22) PCT Filed: Nov. 3, 2017

(86) PCT No.: PCT/KR2017/012425
§ 371 (c)(1),
(2) Date: May 3, 2019

(87) PCT Pub. No.: WO2018/084642
PCT Pub. Date: May 11, 2018

(65) Prior Publication Data
US 2019/0289573 A1    Sep. 19, 2019

(30) Foreign Application Priority Data
Nov. 3, 2016 (KR) .................. 10-2016-0146082
Feb. 13, 2017 (KR) .................. 10-2017-0019388

(51) Int. Cl.
*H04W 72/02*    (2009.01)
*H04W 72/08*    (2009.01)
(Continued)

(52) U.S. Cl.
CPC .......... *H04W 72/02* (2013.01); *H04B 7/0695* (2013.01); *H04W 36/06* (2013.01);
(Continued)

(58) Field of Classification Search
CPC ............ H04W 72/046; H04W 36/305; H04W 72/087; H04W 74/0833; H04W 76/27;
(Continued)

(56) References Cited

U.S. PATENT DOCUMENTS

| 8,982,693 B2 | 3/2015 | Krishnamurthy et al. |
| 2005/0250524 A1* | 11/2005 | Nilsson ............ H04W 56/0085 455/509 |

(Continued)

FOREIGN PATENT DOCUMENTS

| KR | 10-2016-0031171 A | 3/2016 |
| KR | 20160031171 A * | 3/2016 |
| WO | 2016/140599 A1 | 9/2016 |

OTHER PUBLICATIONS

International Search Report dated Feb. 7, 2018 in connection with International Patent Application No. PCT/KR2017/012425, 2 pages.
(Continued)

*Primary Examiner* — Mehmood B. Khan

(57) ABSTRACT

The present disclosure relates to a communication technique for converging an IoT technology with a 5G communication system to support a higher data transmission rate beyond a 4G system, and a system therefor. The present disclosure can be applied to intelligent services (e.g., a smart home, a smart building, a smart city, a smart or connected car, health care, digital education, retail business, and services associated with security and safety, or the like) on the basis of 5G communication technology and an IoT-related technology. The present invention provides a method for determining a radio link failure. The method comprises the steps of: identifying an indication of in synchronization (IS) or out of synchronization (OOS) with respect to a plurality of reception beams; starting a timer to determine a radio link failure when the indication of OOS is identified; and holding the
(Continued)

timer when at least one of the plurality of reception beams is requested to be changed.

9 Claims, 15 Drawing Sheets

(51) Int. Cl.
*H04W 72/04* (2009.01)
*H04W 36/06* (2009.01)
*H04W 76/27* (2018.01)
*H04W 74/08* (2009.01)
*H04B 7/06* (2006.01)

(52) U.S. Cl.
CPC ....... *H04W 72/046* (2013.01); *H04W 72/087* (2013.01); *H04W 74/0833* (2013.01); *H04W 76/27* (2018.02)

(58) Field of Classification Search
CPC ..... H04W 72/02; H04W 76/19; H04W 36/06; H04W 56/00; H04L 1/00; H04L 1/1607; H04B 7/0695; H04B 7/088
See application file for complete search history.

(56) References Cited

U.S. PATENT DOCUMENTS

| | | | |
|---|---|---|---|
| 2015/0085762 A1 | 3/2015 | Matin et al. | |
| 2016/0295611 A1 | 10/2016 | Yin et al. | |
| 2016/0337916 A1* | 11/2016 | Deenoo | H04W 36/0088 |
| 2017/0223690 A1* | 8/2017 | Zeng | H04W 16/28 |
| 2017/0251441 A1* | 8/2017 | Axnas | H04B 7/0632 |
| 2017/0302355 A1* | 10/2017 | Islam | H04W 72/042 |
| 2018/0007605 A1 | 1/2018 | Eriksson et al. | |
| 2018/0020487 A1* | 1/2018 | Tsai | H04B 7/0695 |
| 2018/0041949 A1* | 2/2018 | Liu | H04W 74/0833 |
| 2018/0084446 A1* | 3/2018 | Li | H04W 76/19 |
| 2018/0184387 A1* | 6/2018 | Axen | H04B 7/0617 |
| 2018/0279170 A1* | 9/2018 | Sakamoto | H04L 69/22 |
| 2019/0028170 A1* | 1/2019 | Zhang | H04B 7/022 |
| 2019/0081688 A1* | 3/2019 | Deenoo | H04B 7/088 |
| 2019/0320467 A1* | 10/2019 | Freda | H04W 74/0833 |
| 2019/0335522 A1* | 10/2019 | Zhang | H04W 76/19 |
| 2020/0037385 A1* | 1/2020 | Park | H04W 76/18 |
| 2020/0145079 A1* | 5/2020 | Marinier | H04B 7/0456 |

OTHER PUBLICATIONS

Written Opinion of the International Searching Authority dated Feb. 7, 2018 in connection with International Patent Application No. PCT/KR2017/012425, 6 pages.

Samsung, "Radio Link Failure detection in High Frequency NR systems", 3GPP TSG-RAN WG2 Meeting #95bis, Oct. 10-14, 2016, 3 pages, R2-166533.

Intel Corporation, "Considerations on radio link failure", 3GPP TSG RAN WG2 Meeting #95bis, Oct. 10-14, 2016, 3 pages, R2-166878.

\* cited by examiner

METHOD AND APPARATUS FOR DETERMINING RADIO LINK FAILURE

CROSS-REFERENCE TO RELATED APPLICATIONS

This application is a 371 of International Application No. PCT/KR2017/012425 filed on Nov. 3, 2017, which claims priority to Korean Patent Application No. 10-2016-0146082 filed on Nov. 3, 2016 and Korean Patent Application No. 10-2017-0019388 filed on Feb. 13, 2017, the disclosures of which are herein incorporated by reference in their entirety.

BACKGROUND

1. Field

The present invention relates to a wireless communication system and, in particular, to a method and apparatus for making a radio link failure decision in a system using multiple beams.

2. Description of Related Art

To meet the increased demand for wireless data traffic since the deployment of 4G communication systems, efforts have been made to develop an improved 5G or pre-5G communication system. Therefore, the 5G or pre-5G communication system is also called a "Beyond 4G Network" or a "Post LTE System". Implementation of the 5G communication system in higher frequency (mmWave) bands, e.g., 60 GHz bands, is being considered in order to accomplish higher data rates. To decrease propagation loss of radio waves and increase the transmission distance, beamforming, massive multiple-input multiple-output (MIMO), Full Dimensional MIMO (FD-MIMO), array antenna, analog beam forming, and large scale antenna techniques are being discussed for the 5G communication system. In addition, in the 5G communication system, there are developments under way for system network improvement based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like. In the 5G system, Hybrid FSK and QAM Modulation (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

The Internet, which is a human centered connectivity network where humans generate and consume information, is now evolving into the Internet of Things (IoT) where distributed entities, such as things, exchange and process information without human intervention. The Internet of Everything (IoE), which is a combination of IoT technology and Big Data processing technology through connection with a cloud server, has emerged. As technology elements, such as "sensing technology", "wired/wireless communication and network infrastructure", "service interface technology", and "security technology" have been demanded for IoT implementation, recently there has been research into a sensor network, Machine-to-Machine (M2M) communication, Machine Type Communication (MTC), and so forth. Such an IoT environment may provide intelligent Internet technology services that create new values for human life by collecting and analyzing data generated among connected things. The IoT may be applied to a variety of fields including smart home, smart building, smart city, smart car or connected car, smart grid, health care, smart appliances, and advanced medical services through convergence and combination between existing Information Technology (IT) and various industrial applications.

In line with these developments, various attempts have been made to apply the 5G communication system to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be an example of convergence between the 5G technology and the IoT technology.

The 5G systems will support more diverse services in comparison with the legacy 4G systems. Examples of representative services may include enhanced mobile broadband (eMBB) services, ultra-reliable and low latency communication (URLLC) services, massive machine type communication (mMTC) services, and evolved multimedia broadcast/multicast services (eMBMS). A system supporting the URLLC services may be called URLLC system, and a system supporting the eMBB services may be called eMBB system. The terms "service" and "system" may be interchangeably used.

Unlike in a low frequency band, a cell may be provided with multiple beams in a high frequency band. For example, a beamforming technique may be used. In the legacy communication system, however, a radio link failure (RLF) is declared in a cell-specific manner rather than a beam-specific manner. There is therefore a need to define how to declare an RFL and an operation related to RLF declaration in consideration of a beamforming operation in a system using multiple beams.

SUMMARY

The present invention provides a new method for declaring an RLF in a system using multiple beams.

In accordance with an aspect of the disclosure, a method for determining a radio link failure (RLF) is provided. The method includes identifying an out-of-synchronization (OOS) or in-synchronization (IS) indication for multiple receive beams, starting a timer for determining the RLF if the OOS indication is identified, and holding the timer if a switch of at least one of the multiple receive beams is requested.

In accordance with another aspect of the disclosure, a terminal in a wireless communication system is provided. The terminal includes including a transceiver and a controller. The transceiver is configured to transmit and receive signals to and from a base station. The controller is coupled with the transceiver and is configured to identify an out-of-synchronization (OOS) or in-synchronization (IS) indication for multiple receive beams, start a timer for determining the RLF if the OOS indication is identified, and holding the timer if a switch of at least one of the multiple receive beams is requested.

The RLF declaration method of the present invention is advantageous in terms of making it possible to reattach to a cell at a proper time by preventing an RLF declaration from being unnecessarily delayed or made too early in a system using multiple beams.

DETAILED DESCRIPTION

Figure 1:
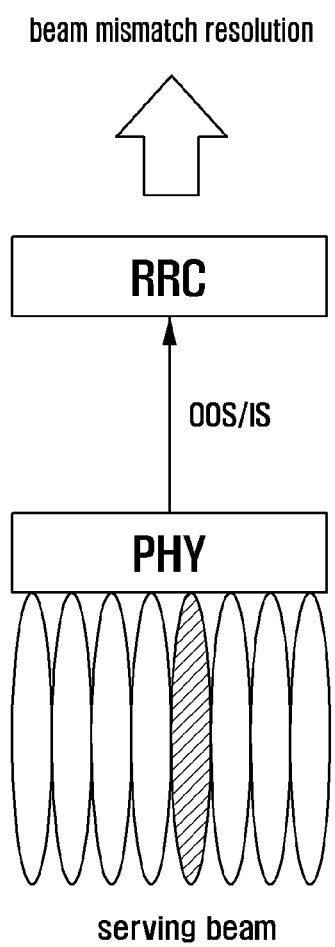
FIG. 1 is a diagram illustrating a method for making an RLF decision based on a serving beam.

Exemplary embodiments of the present invention are described in detail with reference to the accompanying drawings. Detailed descriptions of well-known functions and structures incorporated herein may be omitted to avoid obscuring the subject matter of the present invention. Further, the following terms are defined in consideration of the functionality in the present invention, and they may vary according to the intention of a user or an operator, usage, etc. Therefore, the definition should be made on the basis of the overall content of the present specification.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this invention will be thorough and complete and will fully convey the concept of the invention to those skilled in the art, and the present invention will only be defined by the appended claims. Like reference numerals refer to like elements throughout the specification.

Typically, a physical layer selects beams based on a command from a radio resource control (RRC) layer or a predetermined implementation value. The physical layer performs measurement on the selected beams, generates one or more representative values according to a predetermined calculation method, and sends an indication on the representative values to the RRC layer. Here, the indication is made with a Boolean expression of "out-of-sync. (OOS)" or "in-sync. (IS)".

In order for a terminal to make an RLF decision, the RRC layer of the terminal has to check the physical layer for a problem. The physical layer problem checking may be made by the unit of one beam or multiple beams. In the case of performing the problem checking by the unit of one beam, the corresponding beam may be the one pre-agreed between the terminal and a base station or having the best condition among the beams on which the terminal is performing measurement. It may also be possible that there are multiple serving beams.

Measured signal: the beam measurement proposed in the present invention may be performed based on beam-specific reference signals. It may also be possible to use sector-specific reference signals (RSs). In this case, a beam may in itself mean a sector. The measurement signal may denote a non-UE-based RS and may be radiated by an antenna with an analog or digital beamforming vector at a predetermined interval or as scheduled. Examples of the measurement signal may include a cell-specific RS, a beam-specific RS, a demodulation RS (DMRS), and a channel state information RS (CSI-RS).

1) RLF Decision Based on Serving Beam

FIG. 1 is a diagram illustrating a method for making an RLF decision based on a serving beam. A beam may be decided as a serving beam by the terminal and base station.

In reference to FIG. 1, the physical layer measures a received signal strength on a beam and generates an OOS indication for the case where an average value of the received signal strengths measured during a predetermined time is equal to or less than a given value and an IS indication for the case where the average value is greater than the given value. Alternatively, the physical layer may generate the IS indication for the case where the average value of the received signal strengths measured during the predetermined time is equal to or greater than the given value and the OOS indication for the case where the average value is less than the given value. The physical layer may perform the received signal strength measurement on other beams without generating any history value. If the serving beam is switched according to an agreement with the base station, the physical layer recognizes the switched beam and performs an averaging operation while maintaining the history of the measured values for use in link failure decision-making.

If the physical layer sends the IS or OOS indication to the RRC layer, the RRC layer makes a final RLF declaration in consideration of a number of consecutive repetitions per event and a timing when the corresponding indication is sent. For example, if the OSS indication is repeated over a predetermined number of times, the RRC layer starts a timer; if the IS indication is received at least one time while the timer is running, the RRC layer stops the timer. If the timer expires, the RRC layer declares an RLF. It may be possible to consider the serving beam switching through a beam tracking operation as a factor of stopping the timer. If the serving beam is switched, the RRC layer initializes the timer and restarts the timer based on the OOS indication on the new serving beam. Alternatively, further IS and OOS indications may be generated according to the measured state of the new serving beam regardless of the change of the serving beam. That is, the RRC layer may maintain the timer, but the timer may be stopped by an IS indication generated in association with the new beam.

If the RRC declares an RLF, the terminal performs a cell selection operation again and attempts to establish an RRC connection to the newly selected cell.

2) RLF Decision Based on Beam with Best Received Signal Strength

Figure 2:
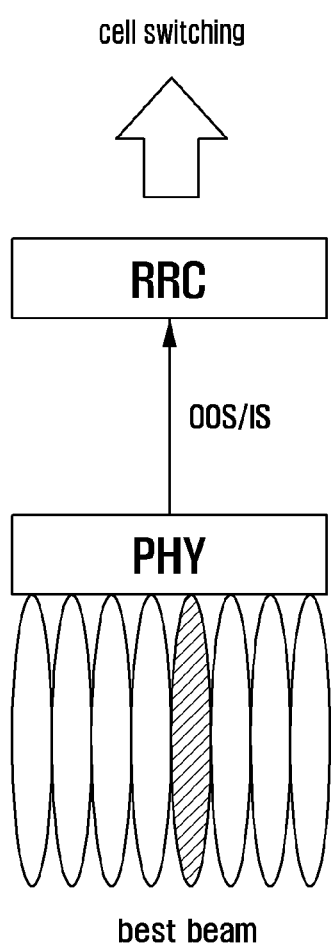
FIG. 2 is a diagram illustrating a method for making an RFL decision based on a beam with the best received signal strength.

FIG. 2 is a diagram illustrating a method for making an RFL decision based on a beam with the best received signal strength.

The terminal may perform measurement on the beams periodically to select the best beam based on the measurement result values. All of the beams on which measurement is performed may become candidates for the best beam. Alternatively, the candidates for the best beam may be limited to the beams of specific transmission/reception points (TRPs) such as serving TRPs or specific cells such as serving cells.

It may be possible to compare the received signal strengths measured on all of the beams during a predetermined measurement period (a period may be from 1 to a specific integer) and determine the beam with the best received signal strength as the best beam. If the period is indicated by an integer greater than 1, it may be possible to average the received signal strengths measured per beam during the corresponding period to select the best beam. If the period is indicated by 1, the best beam may vary with period. Alternatively, the best beam may be defined as a beam with the best received signal strength as a result of comparing the received signal strengths measured on the beams during a time window starting from the current time to a predetermined time rather than the measurement period. In the case of using the time window, the best beam may vary because the time window continuously moves with the current time.

The physical layer make an IS decision or an OOS decision based on the history of the value of the best beam (the values of the best beams, if the best beam has been switched). The best beam changes continuously and, in this case, it may be possible to perform an average operation on the history of the values of the changing beam. Here, the history means the values recorded in an accumulative manner. The physical layer generates the OOS indication for the case where the average received signal strength during a predetermined time period is equal to or greater than a predetermined value and an IS indication for the case where the average received signal strength is less than the predetermined value. Alternatively, the physical layer may generate the IS indication for the case where the average received signal strength is equal to or greater than a predetermined value and the OOS indication for the case where the average received signal strength is less than the predetermined value.

If the physical layer sends the IS or OOS indication to the RRC layer, the RRC layer makes a final RLF declaration in consideration of a number of consecutive repetitions per event and a timing when the corresponding indication is sent. For example, if the OSS indication is repeated over a predetermined number of times, the RRC layer starts a timer; if the IS indication is received at least one time while the timer is running, the RRC layer stops the timer. If the timer expires, the RRC layer declares an RLF.

If there is a suitable beam when the RRC layer declares the RLF, it may be possible to make a request for a beam switching to the corresponding beam. However, because the RLF has been declared on the beam with the best received signal strength, it is likely that there is no suitable beam. Accordingly, the terminal may make a scheduling request or perform an attach procedure for cell search.

3) RLF Decision Based on Representative Value of Multiple Beams

Figure 3:
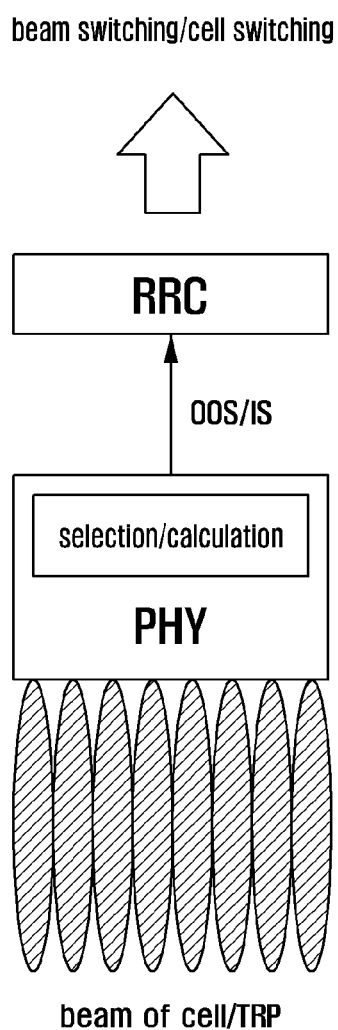
FIG. 3 is a diagram illustrating a method for making an RLF decision based on a representative value of multiple beams

FIG. 3 is a diagram illustrating a method for making an RLF decision based on a representative value of multiple beams.

There may be many methods for generating a representative value in consideration of the strengths of multiple beams. Detailed descriptions thereof are made later. The multiple beams may be all of the beams that can be identified by unique identifiers and measurable or part sorted out from all of the beams. For example, the multiple beams may be selected from the beams of specific cells such as serving cells or specific TRPs such as serving TRPs.

If a representative value of the multiple beams is determined using a method to be described below, the physical layer generates an OOS or IS indication to the RRC layer using the representative value and a predetermined OOS threshold value or IS threshold value. That is, the physical layer generates the OOS indication for the case where the representative value is equal to or less than a predetermined value (i.e., OSS threshold value) and the IS indication for the case where the representative value is greater than the predetermined value. Alternatively, the physical layer generates the IS indication for the case where the representative value is equal to or greater than a predetermined value (i.e., ISS threshold value) and the OSS indication for the case where the representative value is less than the predetermined value.

If the physical layer sends the IS or OOS indication to the RRC layer, the RRC layer makes a final RLF declaration in consideration of a number of consecutive repetitions per event and a timing when the corresponding indication is sent. For example, if the OSS indication is repeated over a predetermined number of times, the RRC layer starts a timer; if the IS indication is received at least one time while the timer is running, the RRC layer stops the timer. If the timer expires, the RRC layer declares an RLF.

If the RRC layer declares the RLF, the terminal may search for another cell or TRP or perform a cell (re)selection procedure to establish an RRC connection.

Figure 4:
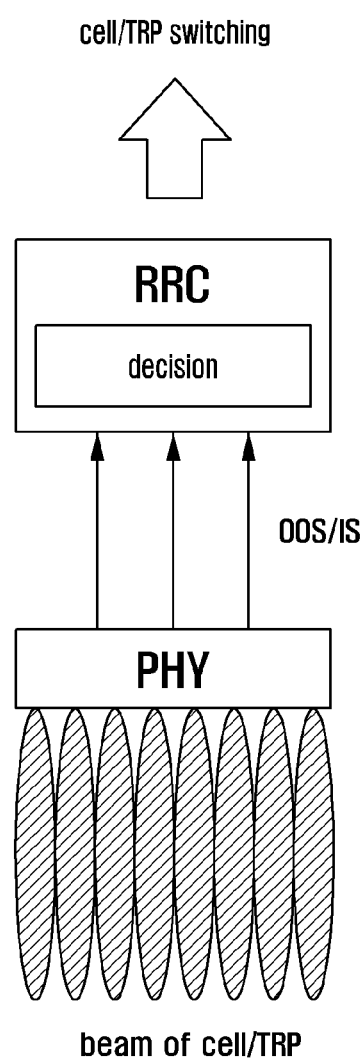
FIG. 4 is a diagram illustrating a method for an RRC layer to make an RLF decision based on beam-specific indications from a physical layer in consideration of multiple beams.

4) RLF Decision by RRC Layer Based on Beam-Specific Indications from Physical Layer Considering Multiple Beams FIG. 4 is a diagram illustrating a method for an RRC layer to make an RLF decision based on beam-specific indications from a physical layer in consideration of multiple beams.

In reference to FIG. 4, the physical layer averages the values measured on a specific beam, unlike the embodiment of FIG. 3 in which the representative value is calculated based on the values measured on multiple beams, to make an OOS or IS decision on the corresponding beam and sends the OOS or IS indication to the RRC layer. If the RRC layer receives the OOS or IS indications on the multiple beams during a predetermined time period, it determines whether to declare an RLF based on the indications.

If the OOS indication on a specific beam is received one or more times consecutively, the RRC layer may start a timer; if the IS indication is not received one or more times before the timer expires, the RRC may declare an RLF. Alternatively, if the OOS indications on multiple specific beams are received, the RRC layer may start a timer; if the IS indication on at least one of the multiple specific beams is received, the RRC layer may stop the timer. If no IS indication on at least one of the beams is received before the timer expires, the RRC layer may declare an RLF. The physical layer may send the RRC layer an ID of the corresponding beam along with the IS or OOS indication.

According to an embodiment, if the terminal performs measurement on the beams of multiple TRPs, a beam of a specific TRP may become a representative beam or a serving beam. In this case, if the RRC layer receives no IS indication, during a predetermined time period, on the representative beam or the serving beam of all of the TRPs on which the OOS indication has been received, the terminal may declare an RLF. If no OOS indication is received on the representative beam or serving beam of a specific TRP among the multiple TRPs in consideration and the signal remains at a good level, even though an OOS indication on one of the rest of the beams is received, the terminal may not declare an RLF. Instead of declaring an RLF, the terminal may perform a procedure for switching the beam of the TRP in a bad state. For example, the terminal may send a request for switching from the beam of the TRP in the bad state to the beam of a TRP in a good state.

In association with the above operations, it may be possible to assume a situation where the terminal has connections with multiple cells (PCell or PSCell). For example, cells 1 and 2 may each have multiple TRPs. The network may transmit to the terminal the information on the beam of the corresponding TRP or an ID of the TRP. The terminal may ascertain the beam of the cell to which it wants to connect based on the information. The physical layer may generate the OOS or IS indication on the specific beam or serving beam among the beams of the corresponding cell or TRP in the same way as described above. The physical layer may send the RRC layer the TRP information or cell information of the beam on which the OOS or IS indication is generated along with the OOS or IS indication. The information on the TRP may be transparent to the RRC layer. Accordingly, the physical layer may send the RRC layer the cell ID or identifier along with the OOS or IS indication. If no IS indication is received before the expiry of a predetermined timer after receiving the OOS indication from all of the cells, the RRC layer may declare an RLF. Alternatively, if no IS indication is received before the expiry of a predetermined timer after the receipt of the OOS indication in a specific cell, the RRC layer may declare or release an RLF only for the corresponding cell and perform a cell search procedure.

5-1) Cause of RLF on Layer 2

It may be necessary to define errors occurring in the course of a beam management operation as new RLF causes in a high frequency new radio (HF-NR) system. First, if it is necessary to search for a new beam because there is no beam with a received signal strength equal to or greater than a predetermined threshold value during a beam tracking based on a beam measurement result, the terminal may perform a scheduling request (SR) or a random access (RA) to inform a network that it is necessary to discover a new serving beam in a serving cell or another cell. In this case, an indication of an SR failure or RA failure may be produced by a media access control (MAC) layer. In detail, if no uplink (UL) resources are allocated in response to a predetermined number of SRs, an RLF may be declared. If no UL resources are allocated during a predetermined time period from the time point when the SR for first beam switching was transmitted, this may be considered as an SR failure situation. If the RA is performed over a predetermined number of times for beam switching based a RACH, an RLF may be declared if no UL resources are allocated for transmitting a beam changing indication. In addition or alternatively, if no UL resources are allocated during a predetermined time period starting from the time point when the RA for beam change was started, this may be considered as an RA failure situation. In the case where a timer is introduced for a beam recovery operation as to be described below, if the timer expires (i.e., beam recovery fails), layer 2 may declare an RLF. In the following descriptions, the term "beam switching" is used to mean a beam recovery or a beam change.

In the case where carrier aggregation (CA) is used, an RLF may be declared by the unit of component carrier (CC) because a CC corresponds to a serving cell.

5-1-1) Operation of Physical Layer OOS Timer for RLF

As described above, if the OOS indication made by the physical layer according to scheme 1) of generating an indication in consideration of a signal or multiple serving beams, scheme 2) of generating an indication in consideration of the best beam, or scheme 3) or 4) of generating one or multiple indications in consideration of multiple beams, a physical layer timer starts running in order for the RRC layer to declare an RLF. This timer is referred to as OOS timer or RLF timer. In LTE, the RRC layer declares an RLF just upon expiry of the OOS timer. In the disclosure, however, it is proposed to hold the timer, if there is any beam switching operation on layer 1 or layer 2 in the middle of the beam management, during the corresponding operation. This is to exclude the time taken for the beam switching operation from the bad channel estimation time.

Figure 5:
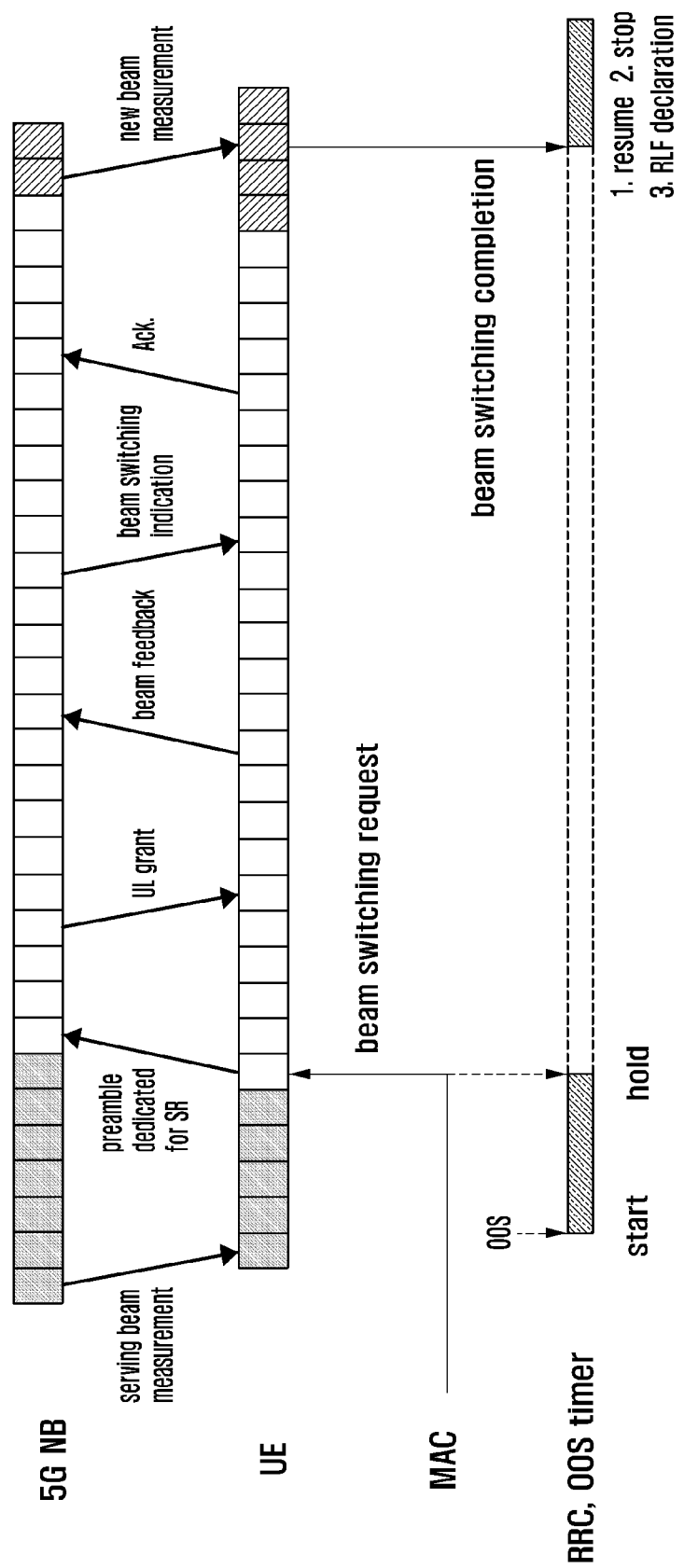
FIG. 5 is a diagram illustrating an example where an OOS timer is held during an SR-based beam switching procedure.

FIG. 5 is a diagram illustrating an example where an OOS timer is held during an SR-based beam switching procedure.

In reference to FIG. 5, a terminal that is performing measurement on a serving beam detects a beam failure, transmits, if a beam failure occurs, an SR preamble dedicated for beam switching to a base station, receives a UL grant from the base station, transmits a beam state information (BSI) feedback to the base station based on the UL grant, receives a beam switching indication from the base station, and transmits an acknowledgement (ACK) corresponding to the beam switching indication. The terminal performs measurement on the new serving beam within a predetermined time after the serving beam is switched. The terminal may also perform measurement on other beams as well as on the serving beam.

As described above, if the received signal strength of the serving beam is less than the OOS threshold value, the physical layer sends the OOS indication to the RRC layer. Alternatively, the physical layer may send the OOS indication repetitively a predetermined number of times. Upon receipt of the OOS indication from the physical layer, the RRC layer starts the OOS timer.

If there is a beam with a better offset, a beam switching may be performed. When initiating the beam switching, the MAC (or physical) layer makes a beam switching signaling. For example, the MAC layer may send a beam switching request at the timing of transmitting the dedicated SR for beam switching. In the case where the beam switching is performed in an SR-based event-driven manner, the OOS timer holds until the beam switching is completed after the time point when the SR has been transmitted. In this case, the physical layer or MAC layer sends a beam switching indication to the RRC layer to notify the RRC layer of the SR transmission timing.

If the beam switching is successfully completed, the timer resumes. If the timer resumes, this means that the timer is running (i.e. reverse-counting) from where it held or that the timer is initialized and running (i.e. reverse-counting) from the beginning. The terminal performs measurement of the new serving beam and, if an OOS occurs thereon, the timer continues running. If the timer expires, the RRC layer declares an RLF. If an IS occurs on the new serving beam, the timer expires. If the timer expires, this means that the timer stops and is initialized to its default value. As described above, if a problem arises during the SR-based beam switching procedure, the RRC layer may declare an RLF immediately without waiting for the expiry of the timer. If the terminal is performing measurement on the new serving beam before the beam switching to the new serving beam is completed, it may be possible to resume the timer immediately without extra beam measurement time (for the case where the result of the measurement on the new serving beam is OOS) or stop the timer (for the case where the result of the measurement on the new serving beam is IS).

Figure 6:
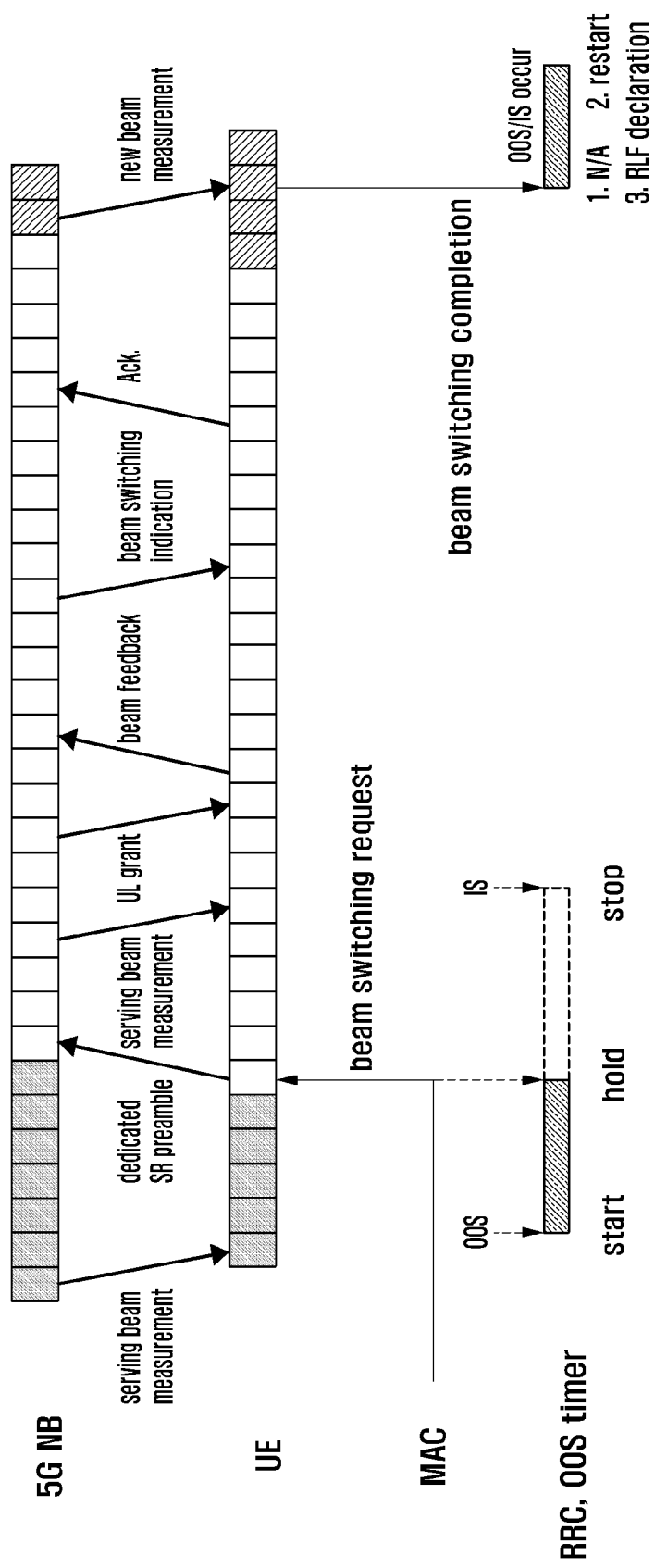
FIG. 6 is a diagram illustrating a mechanism for reflecting measurement results of old serving beams continuously during the beam switching procedure of FIG. 5.

FIG. 6 is a diagram illustrating a mechanism for reflecting measurement results of old serving beams continuously during the beam switching procedure of FIG. 5.

As described in the embodiment of FIG. 5, upon receiving an OOS indication for a serving beam, a timer is initiated; and after then, if the beam switching procedure is initiated, the timer is held. According to the embodiment of FIG. 6, if the result of the measurement on the old serving beam corresponds to IS even while the timer is held, the timer stops. If the result of the measurement on the old serving beam is OOS, the timer remains in the state of being held.

In the case where the timer stops in the course of the beam switching procedure, if the physical layer sends an IS indication for the new serving beam after the beam switching procedure is completed, the time is not activated. If the physical layer sends an OOS indication for the new serving beam, the timer resumes.

If the timer does not stop in the course of the beam switching procedure, this is the case of the embodiment of FIG. 5. That is, the timer resumes when the beam switching procedure is completed and, if the OOS indication for the new serving beam is received, the timer continues. Afterward, if the timer expires, an RLF is declared. If an IS indication is received for the new serving beam, the timer stops.

If the SR beam switching procedure fails, an RLF may be immediately declared. In order to accomplish this, the MAC or physical layer may send a beam switching failure indication to the RRC layer.

In an alternative embodiment, the above-described operation may be performed for the case of a beam feedback through a random access channel (RACH) rather than an SR-based event-driven beam feedback. That is, it may be possible to hold the timer during the beam switching operation and ignore a beam measurement result as in the embodiment of FIG. 5, to reflect the beam measurement result even while the timer is held (FIG. 6), or to have the timer operate regardless of the beam switching operation. If the terminal notices the beam switching failure through the RACH rather than the SR, it may declare an RLF. In this case, the MAC or physical layer may send a beam switching failure indication to the RRC layer. The timer may be configured to operate based on RACH-based event-driven beam feedback and a beam switching operation.

Figure 7:
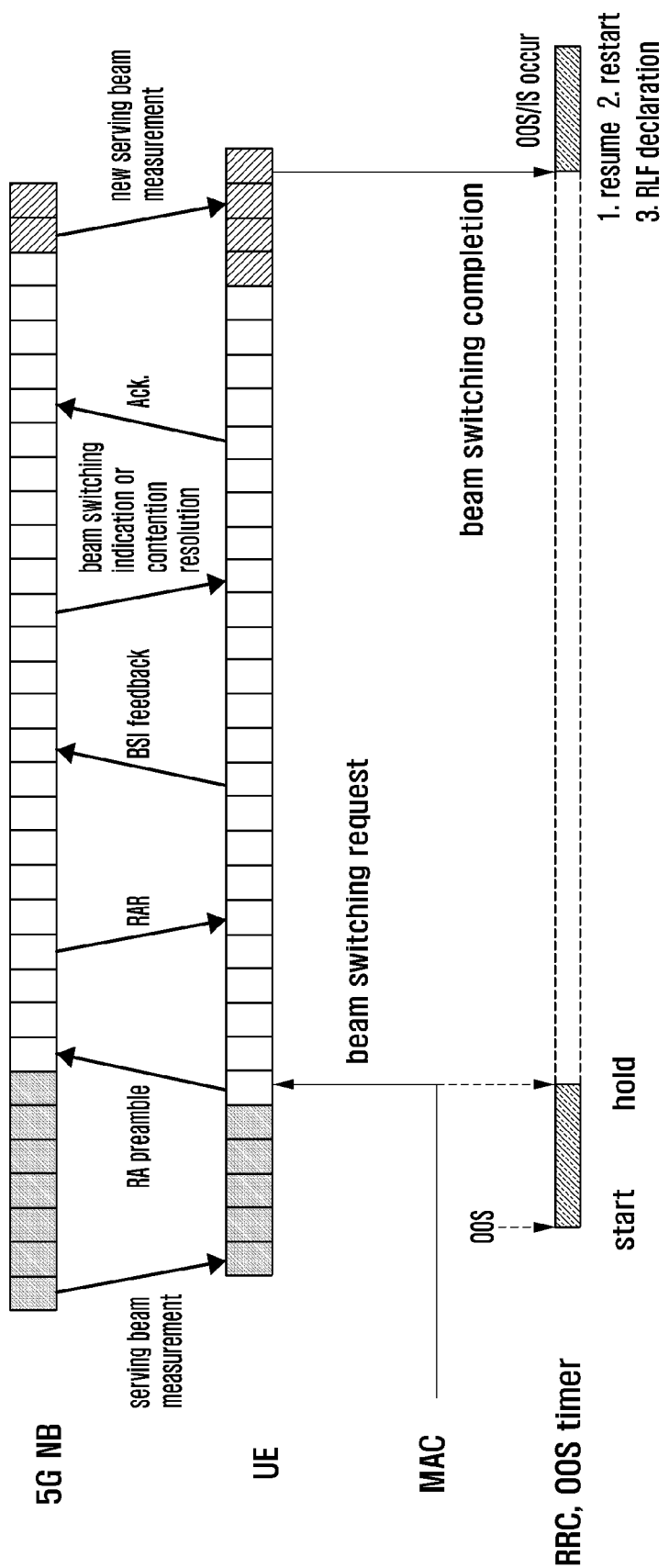
FIG. 7 is a diagram illustrating an example where an OOS timer is held during an RA-based beam switching procedure.
Figure 8:
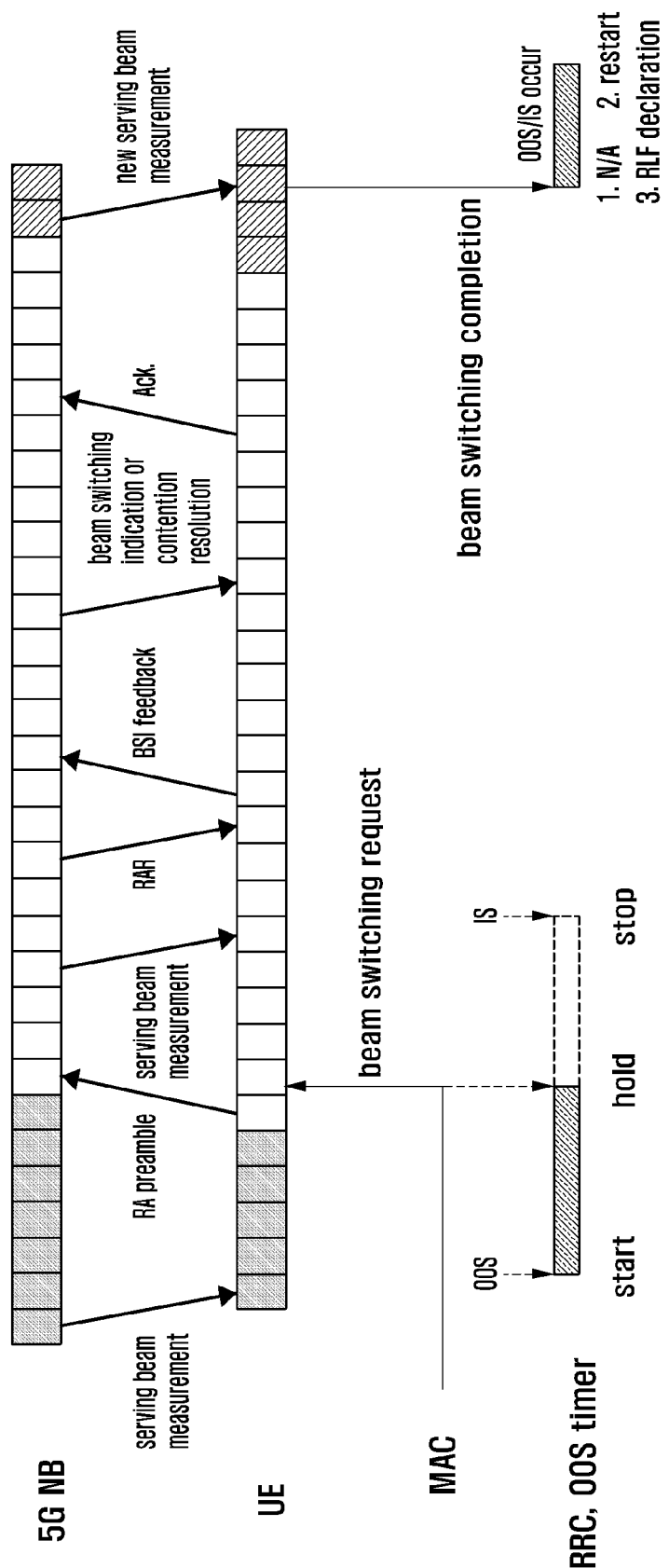
FIG. 8 is a diagram illustrating a mechanism for reflecting a measurement result of an old serving beam during the beam switching procedure of FIG. 7.

FIG. 7 is a diagram illustrating an example where an OOS timer is held during an RA-based beam switching procedure. FIG. 8 is a diagram illustrating a mechanism for reflecting a measurement result of an old serving beam during the beam switching procedure of FIG. 7.

The embodiments of FIGS. 7 and 8 that are directed to the RACH-based beam feedback correspond to the embodiments of FIGS. 5 and 6 that are directed to the SR-based event-driven beam feedback. In detail, the operations for a terminal to transmit an RACH preamble through a physical random access channel (PRACH) to a base station, to receive a random access response (RAR) for a receive beam from the base station, to transmit a BSI feedback to the base station through message 3, to receive a beam feedback such as a beam switching indication or contention resolution from the base station through the RACH, to transmit an acknowledgement (ACK) corresponding to the indication, and to perform a beam switching correspond to the operations described in the embodiments of FIGS. 5 and 6 that are directed to the SR-based event-driven beam feedback. Descriptions of other operations that are identical with the corresponding operations in the embodiments of FIGS. 5 and 6 are omitted herein.

The above-described beam switching-related operations may be implemented in various manners according to the operations designed for layers 1 and 2. For the operations of switching a beam and searching for a new beam after recognizing unavailability of the current serving beam, various detailed operations described in the embodiments directed to the SR-based and RACH-based operations and beam switching success or failure may be associated with the operations of starting, pausing, and terminating the OOS timer. The detailed beam switching operation may be implemented as follows.

Figure 9:
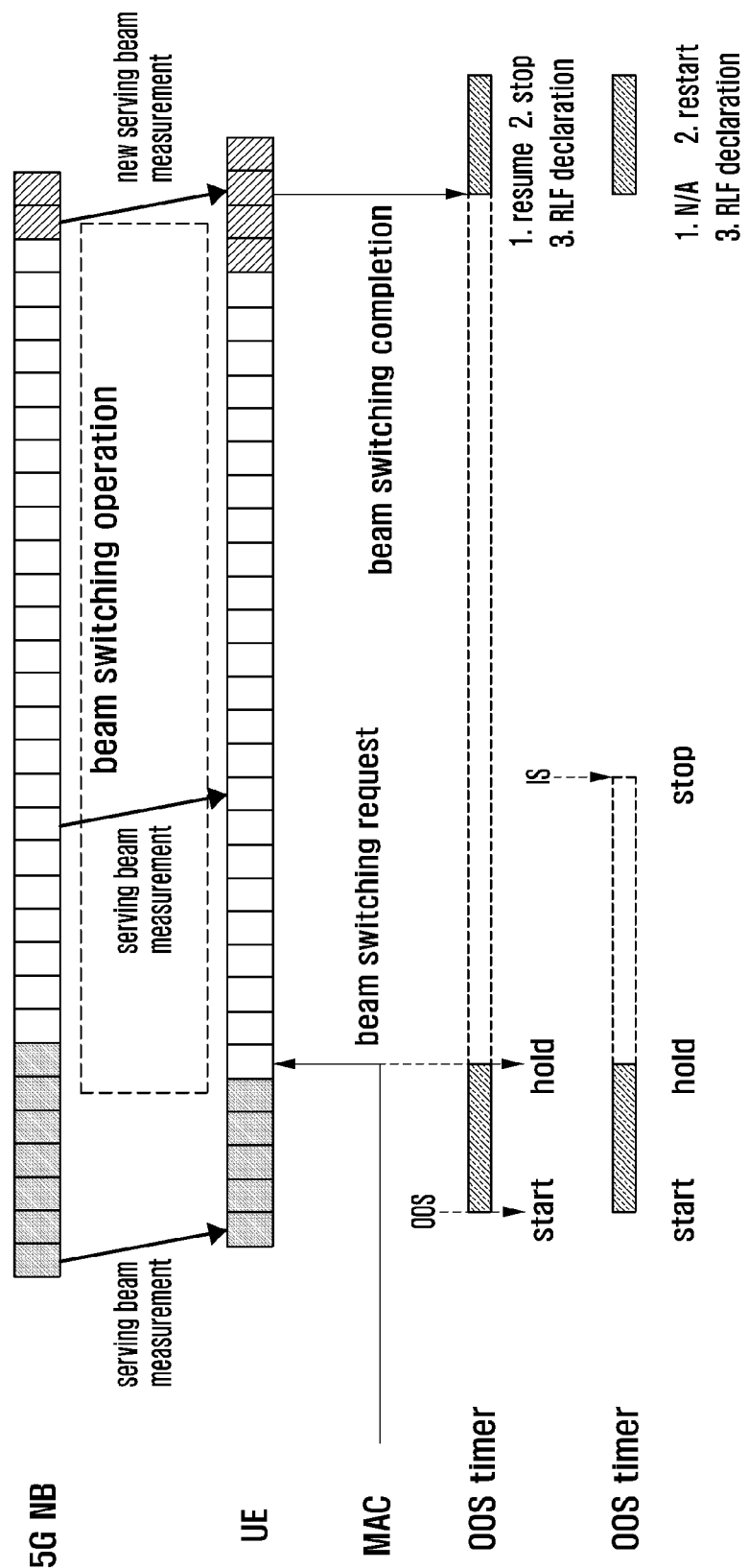
FIG. 9 is a diagram illustrating a situation where a beam switching operation start timing is later than an OOS timer start timing.

FIG. 9 is a diagram illustrating a situation where a beam switching operation start timing is later than an OOS timer start timing. As in the embodiments of FIGS. 5 to 8, if the beam switching operation is triggered after the OOS timer starts, the timer is held.

Figure 10:
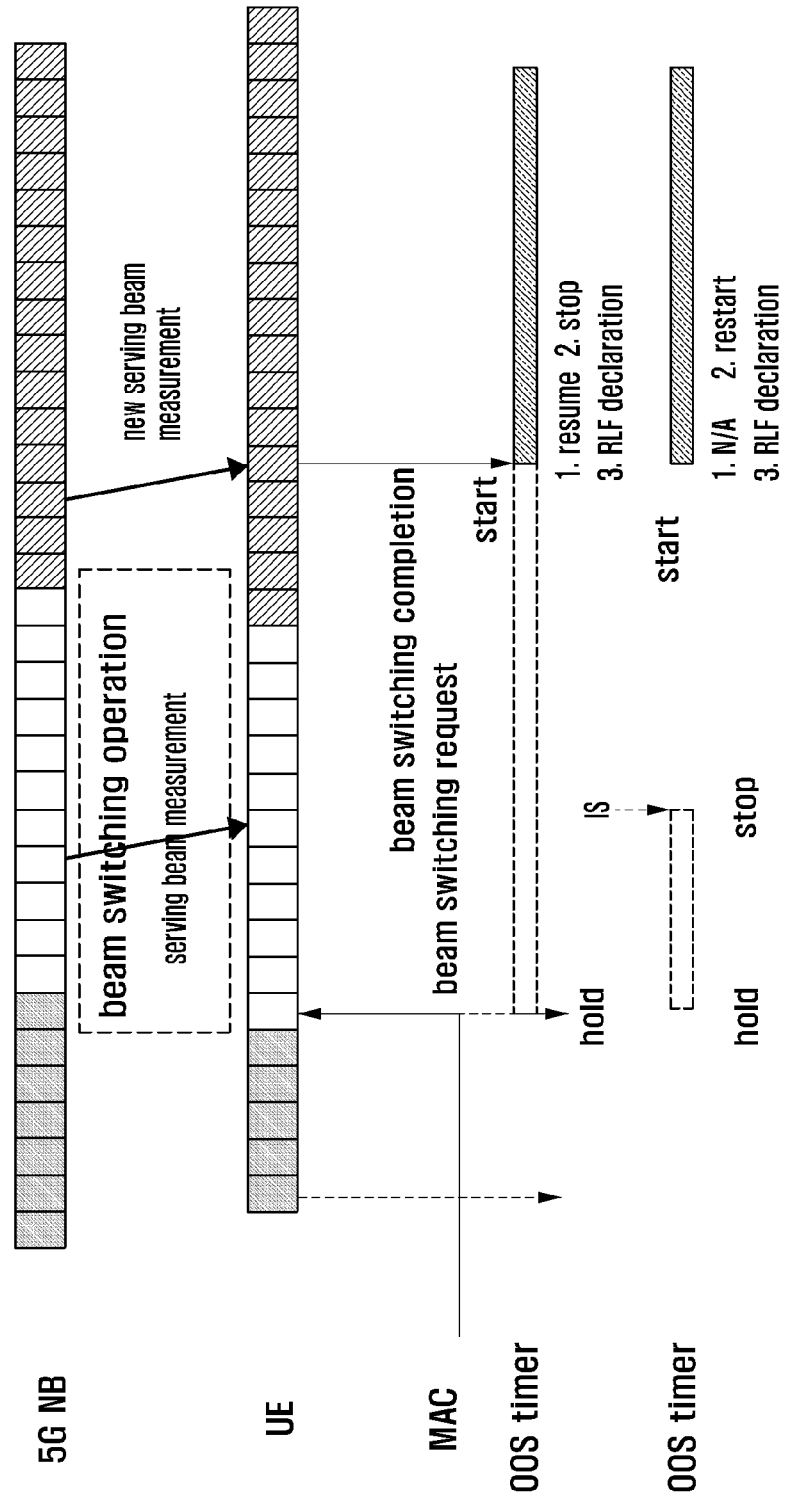
FIG. 10 is a diagram illustrating a case where the beam switching operation start timing precedes the OOS timer start timing.

FIG. 10 shows a case where the beam switching operation start timing precedes the OOS timer start timing.

In reference to FIG. 10, the OOS timer start timing may be deferred so that it happens after the beam switching operation. In detail, the OOS timer may start after it is determined whether the serving beam newly selected as a result of the beam switching operation is in the OOS or IS state. In the embodiment of FIG. 10, the OOS timer may be configured to start if the OSS indication is received 3 times consecutively, and the beam switching operation may be triggered if the received signal strength of the receive beam is not greater than an OOS threshold value at least one time, i.e., if the OOS indication is generated at least one time. The beam switching operation may be configured to be triggered when the received signal strength of a specific RS is equal to or less than a given threshold value, and the beam switching operation start timing may precede the OOS timer start timing even if the specific RS is one of the RSs configured as radio link monitoring (RLM) RSs. The example of FIG. 10 is occurred when the beam switching RS satisfies a trigger metric and then the RLM RSs cause OSS if the beam switching RS differs from the RLM RSs or the beam switching RS is one of the RLM RSs. Like the case where the beam switching and RLM RSs are identical with each other or OOS indications are identical in number, the beam switching start condition and the OOS timer start condition may be identical with each other.

There may be multiple serving beams rather than one serving beam. If there are multiple serving beams, a comparison is made with the OOS or IS threshold value per beam. If the received signal strengths of all of the beams is less than the OOS threshold value, the physical layer determines that the serving beams are in the OOS state and sends an OOS indication to the RRC layer. If the received signal strengths of all of the beams is greater than the IS threshold value or at least one of them is greater than the IS threshold value, the serving beam is determined as in the IS state. If the received signal strengths of part of the beams are not greater than the OOS threshold value, the beam switching is performed using the beams of which the received signal strengths are greater than the OOS threshold value. In the beam switching procedures of the embodiments of FIGS. 5 to 10 and normal beam switching procedures, if there are multiple serving beams, the OOS timer may start if the received signal strengths of all of the beams are not greater than the OOS threshold value. In other operations of the beam switching procedure, the OOS or IS indication may be substituted by an OOS decision or IS decision on the aforementioned multiple beams.

5-1-2) Introduction of Timer in Beam Switching Operation

In the above embodiments, the OOS timer is initiated by a certain operation that is implicitly considered as a beam switching operation. However, it may also be possible to introduce a timer for the beam switching operation, i.e., beam switching timer. That is, the beam switching timer may be used along with the OOS timer. If a beam switching procedure is triggered, the beam switching timer starts, and the OOS timer is held. If the beam switching procedure is completed, the beam switching timer stops, and the OOS timer resumes. If the received signal strength of the new serving beam is greater than the IS threshold value, the OOS timer also stops. If an IS indication for the old serving beam is identified during the beam switching operation, the beam switching operation and beam switching timer may stop.

If the beam switching timer expires, a layer 2 entity in charge of RLF declaration may declare RLF regardless of the OOS timer.

If the beam switching procedure starts, the physical layer may send no OOS indication for the serving beam. As a consequence, the OOS timer operated by the RRC layer may not start. When the beam switching operation ends or the beam switching timer stops or expires, the physical layer measures the quality of the new serving beam and, if the measurement result indicates OOS, sends an OOS indication to the RRC layer, which may restart or resume the OOS timer.

5-2) Beam Switching Request Operation or Operation Search for New Cell

In the case of the serving beam-based RLF decision-making, the terminal may request for serving beam switching after an RLF declaration. In another type of RLF decision, it may be possible to search for a new cell or TRP to reattach to the network. The terminal may use an SR or RACH preamble to request for beam switching. That is, the terminal may make a beam switching request with the SR or RACH preamble dedicated for beam switching or, if there is another suitable beam, transmit a beam switching or TRP switching indication through an uplink channel using the corresponding beam. The operation of searching for a new cell is a procedure being performed in such a way of discovering synchronization signals on available frequencies and performing measurement on the signals and an RA to a cell with a sufficiently strong signal to reattach to the network. In the serving beam-based RLF decision-making, the terminal may transmit a serving beam switching indication to the base station via a MAC control element (CE), SR, or RACH.

The beam switching operation trigger condition (criterion) may be that the strength of the serving beam becomes equal to or less than an OOS threshold value over a predetermined number of times during a predetermined time period. Another additional condition may be that the beam switching operation is performed without generating any OOS indication, if there is another beam in a state better than that of the serving beam, and no OOS timer-related operation is initiated. After the beam switching operation, the physical layer performs measurement on the new serving beam to determine whether the new serving beam is in the OOS or IS state and, if the new serving beam is in the OOS state, generates an OOS indication. If the OOS indication is received from the physical layer, the RRC layer starts the OOS timer.

6) Method for Determining OOS Threshold Value/IS Threshold Value

The OOS threshold value (Nut means a downlink radio quality value equal to or less than a hypothetical block error rate of Z % on a control channel (e.g., physical downlink control channel (PDCCH)) in consideration of a predetermined transmission parameter and a tolerable error. The control channel may be transmitted via the serving beam. In the case where there are multiple serving beams, if the radio qualities of all of the serving beams are not greater than the OOS threshold value $Q_{out}$, an OOS indication is generated.

The IS threshold value $Q_{in}$ means a downlink radio quality value equal to a hypothetical block error rate of X % on a control channel (e.g., PDCCH) in consideration of a predetermined transmission parameter and a tolerable error. The control channel may be transmitted via the serving beam. In the case where there are multiple serving beams, if the radio quality of at least one serving beam is greater than the IS threshold value $Q_{in}$, an IS indication is generated.

The implementation may determine the values of Z and Q. If there is no channel considered having error, no error may be considered. The threshold value may be a value of a reference signal received quality (RSRQ), a reference signal received power (RSRP), or a received signal strength indicator (RSSI).

The IS or OOS decision is made by measuring a received signal power (such as a beam measurement reference signal (BRS), a CSI-RS, an MDRS, and a cell-specific RS) and comparing the measurement value with the threshold value. The RS may be transmitted on a serving beam or a predetermined beam among multiple beams. Alternatively, it may be possible to compare the measurement results on all of the multiple beams with the threshold value. An objection of such an RLM may be according to one of the aforementioned methods.

If a time window for calculating an RLF metric is less than a full sweep period for acquiring all Tx-Rx beam pairs, it may not be possible to apply a term wise linear combination among calculation methods A to H to be described later. In this case, all measurement values collected by applying methods A to D during the time window without any term wise linear combination are used as calculation sources in separation from the term.

In an alternative example related to the Tx-Rx beam pairs, a scheduling beam synchronized with a base station (eNB) may be considered as a Tx beam for measurement. That is, the terminal (UE) and the base station may determine the beam for transmitting data and control information to the terminal based on the measurement. In this case, the beam synchronized with the network may be determined as a measurement beam for making an RFL decision, and the terminal is always tracking the corresponding beam to perform a beam measurement.

Although the beam measurement is performed on the scheduling beam, it is preferable that the Rx beam is a beam favored by the UE. The RS measurement value obtained from the scheduling Tx beam and Rx beam determines the OOS/IS state. As described above, a BRS measurement value at a time slot corresponding to a scheduling beam ID among regularly distributed BRS slots may be basically used as the source of an RS. It may also be possible to perform measurement selectively on the RS in a scheduled time slot (subframe). In this case, there may be a need of a threshold value conversion method for making an OOS or IS decision between the BRS measurement value and the scheduling beam RS measurement value.

Meanwhile, it may be possible to divide the measurement values of the beams by a number of beams or to divide the accumulated measurement values of the beams by the number of beams or a number of measurement times. That is, it may be possible to perform an averaging operation for calculating the strength of a beam per unit time or unit number of measurements.

7) Method for Calculating Representative Value of Multiple Beams

The representative value of multiple beams is calculated in consideration of the values measured on the Tx-Rx beam pairs according to the time and a type and number of beams based on the BRS, common reference signal, or CSI-RS after a target beam is determined.

OOS Decision-Making Method

As to be described later, all of an RS in a measurement slot, an RS on a scheduled beam, and MD RS on a PDCCH can be measurement sources, and the measurement values thereon may be considered all together. Unlike the CRS, the BRS is an RS for use in measurement that is carried by an analog beam, and two or more analog beams cover a cell in a disjointed manner to server terminals in the cell. The reference signal being transmitted in the above manner for use in measurement of RSRP, RSRQ, or RSSI may be defined as a BRS.

1. Case of Considering Only RS of Measurement Slot

A consideration may be made of the measurement slot as follows. At beam sweeping slot, an eNB TX transmits BRSs on each beam, and sweeps them in order. While the eNB sweeps the TX beam, a RX receives the BRS on a certain RX beam and performs measurement on the BRS. An alternative case may be possible. For example, if the eNB TX transmits the BRS repetitively on the same TX beam, the UE may sweep the RX beam. This method may be applicable to all cases of using alternatives of the source RSs and IS decision methods proposed in the disclosure. Assuming that a term available for measurement on every combination of TX and RX beams in any case is term 1, a specific time T as to be mentioned below may become multiple terms.

Figure 11:
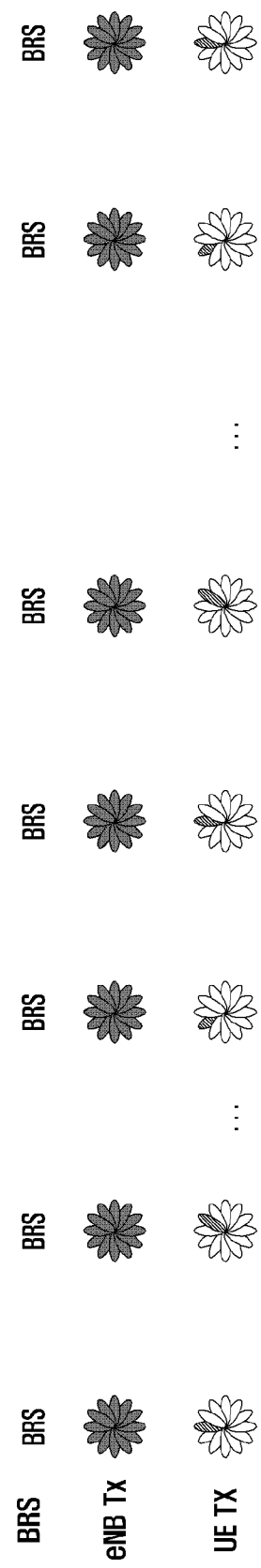
FIG. 11 is a diagram illustrating an exemplary BRS-based measurement.

FIG. 11 is a diagram illustrating an exemplary BRS-based measurement.

A. Use of different value per [calculation by 1 TX-1 RX beam pair] term: This is the case where the N best measurement values, among values measured on all TX-RX beam pairs regardless of a beam during a predetermined time period, are less than a threshold value, i.e., the N best measurement values among all measurement values on all individual determination targets at all terms per every pair under the assumption that the measurement value of the TX-RX pair of term 1 and the measurement value of the same TX-RX pair of term 2 are treated as different measurement values are less than the OOS threshold value.

B. Use of different value per [calculation by 1 Tx-M Rx pair] term: It is performed first to select M RX beams per every TX beam during a predetermined time period and calculate an average or a linear combination value of the measurement values on multiple RX beams per corresponding TX beam. This means the case where N best values, among the values calculated for all TX beams under the assumption of treating the per-TX average (or linear combination) values per term as different values, are less than the OOS threshold value. Here, M may be a given value or a value selected per UE based on a predetermined metric.

C. [calculation by 1 TX-1 RX beam pair] Use of different value per term: This is the case where a value obtained by averaging or linear-combining the N measurement values selected in Case A is less than the OOS threshold value.

D. [calculation by 1 Tx-M Rx pair] Use of different value per term: This is the case where a value obtained by averaging or linear-combining the N measurement values selected in Case B is less than the OOS threshold value. Here, M may be a given value or a value selected per UE based on a predetermined metric.

E. [calculation by 1 Tx-1Rx beam pair] Use of average per term: This is the case where the N best measurement values, among the values obtained by linear-combining per beam pair per term in association with the TX-RX beam pairs measured during a predetermined time, are all less than the OOS threshold value. Here, M may be a given value or a value selected per UE based on a predetermined metric.

F. [calculation by 1 Tx-M RX beam pair] Use of average per term: This is the case where the N best values, among the per-TX beam values obtained by linear-combining the TX beams per term using values obtained by linear combining the M RX beam measurement values per every TX beam per term, are all less than the OOS threshold value. Here, M may be a given value or a value selected per UE based on a predetermined metric.

G. [calculation by 1 TX-1 RX beam pair] This is the case where a value obtained by linear combining the values of the N best beam pairs selected in Case E is less than the OOS threshold value. Here, M may be a given value or a value selected per UE based on a predetermined metric.

H. [calculation by 1 TX-M RX beam pair] This is the case where a value obtained by linear-combining N best values calculated in Case F is less than the OOS threshold value. Here, M may be a given value or a value selected per UE based on a predetermined metric.

2. When RS Exist on Scheduled Analog Beam Outside Measurement Slot

In this case, the information on the RS resource location on the corresponding scheduled TX beam should be shared in advance.

Figure 12:
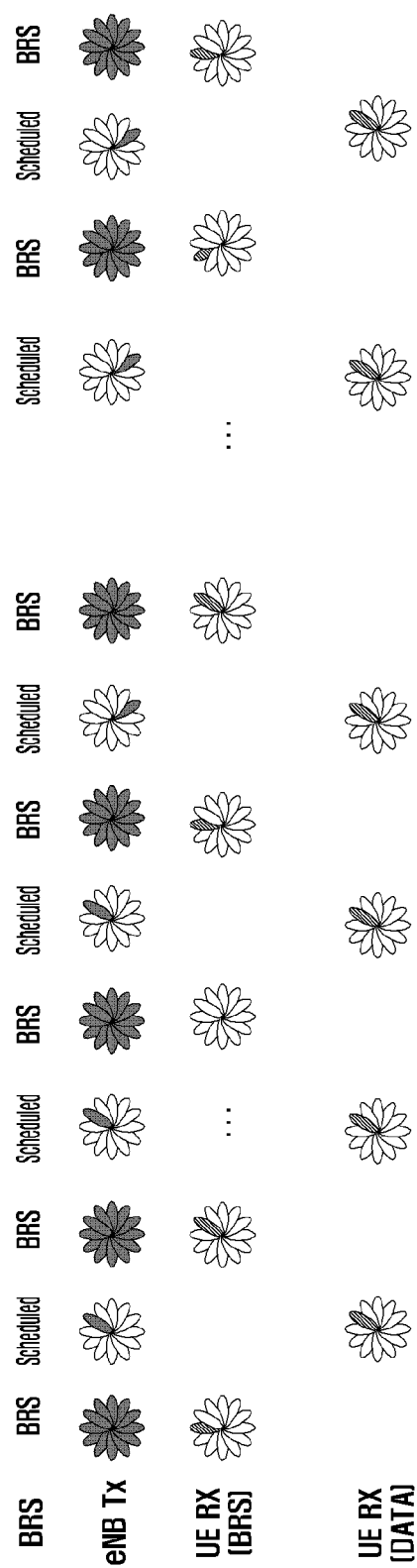
FIG. 12 is a diagram illustrating a case where an RS exists on an analog beam.

FIG. 12 is a diagram illustrating a case where an RS exists on an analog beam.

It is performed to add measurement values on the scheduled beams in addition to the measurement values obtained in the previous measurement slots during a specific time period as samples. Sections A to H of case 1 are applied to the rest without modification. Because the measurement results on the scheduled TX beams and the corresponding RX beams are added to Case 1, every calculation is made by way of adding the measurement values on the corresponding TX-RX beam pairs.

IS Decision-Making Method

Unlike the OOS decision-making, if a predetermined number of best measurement values is greater than a predetermined threshold value, an IS-decision is made. That is, as in making an OOS decision, when performing measurement on the RX in a measurement slot, both of the RS on the scheduled beam and DMRS on the PDCCH can be measurement sources, and the measurement values thereon may be considered all together. In this situation, the measurement slot as depicted in FIG. 12 may be considered. FIG. 12 shows a case where an eNB transmits the BRS on every TX beam and the UE receives one RX beam while the eNB is sweeping the TX beam. However, if the eNB transmits the same TX beam repetitively, the UE may sweep the RX beam. Assuming that a term available for measurement on every combination of TX and RX beams in any case is term 1, a specific time T as to be mentioned below may become multiple terms.

In view of the RX source change, the number of cases being considered in making an OOS decision is applied identically. In the case of considering only the RS in the measurement slot, if an RS exists on a scheduled analog beam outside the measurement slot, this is the case where the DMRS for PDCCH decoding is carried by the scheduled beam. Descriptions are made of the detection metric calculation methods for the respective cases hereinafter.

A. [calculation by 1 TX-1 RX beam pair] Use of different value per term: This is the case where the N best measurement values, among values measured on all TX-RX beam pairs regardless of a beam during a predetermined time period, are greater than an IS threshold value, i.e., the N best measurement values among all measurement values on all individual determination targets at all terms per every pair under the assumption that the measurement value of the TX-RX pair of term 1 and the measurement value of the same TX-RX pair of term 2 are treated as different measurement values are greater than the IS threshold value.

B. [calculation by 1 Tx-M Rx pair] Use of different value per term: It is performed to first select M RX beams per every TX beam during a predetermined time period and calculate an average or a linear combination value of the measurement values on multiple RX beams per corresponding TX beam. This means the case where N best values, among the values calculated for all TX beams under the assumption of treating the per-TX average (or linear combination) values per term as different values, are greater than the IS threshold value. Here, M may be a given value or a value selected per UE based on a predetermined metric.

C. [calculation by 1 TX-1 RX beam pair] Use of different value per term: This is the case where a value obtained by averaging or linear-combining the N measurement values selected in Case A is greater than the IS threshold value.

D. [calculation by 1 Tx-M Rx pair] Use of different value per term: This is the case where a value obtained by averaging or linear-combining the N measurement values selected in Case B is greater than the IS threshold value. Here, M may be a given value or a value selected per UE based on a predetermined metric.

E. [calculation by 1 Tx-1Rx beam pair] Use of average per term: This is the case where the N best measurement values, among the values obtained by linear-combining per beam pair per term in association with the TX-RX beam pairs measured during a predetermined time, are all greater than the IS threshold value. Here, M may be a given value or a value selected per UE based on a predetermined metric.

F. [calculation by 1 TX-M RX beam pair] Use of average per term: This is the case where the N best values, among the per-TX beam values obtained by linear-combining the TX beams per term using values obtained by linear combining the M RX beam measurement values per every TX beam per term, are all greater than the IS threshold value. Here, M may be a given value or a value selected per UE based on a predetermined metric.

G. [calculation by 1 TX-1 RX beam pair] This is the case where a value obtained by linear combining the values of the N best beam pairs selected in Case E is greater than the IS threshold value. Here, M may be a given value or a value selected per UE based on a predetermined metric.

H. [calculation by 1 TX-M RX beam pair] This is the case where a value obtained by linear-combining N best values calculated in Case F is greater than the IS threshold value. Here, M may be a given value or a value selected per UE based on a predetermined metric.

For a time region considering the OOS/IS, a variation may be given as follows.

Figure 13:
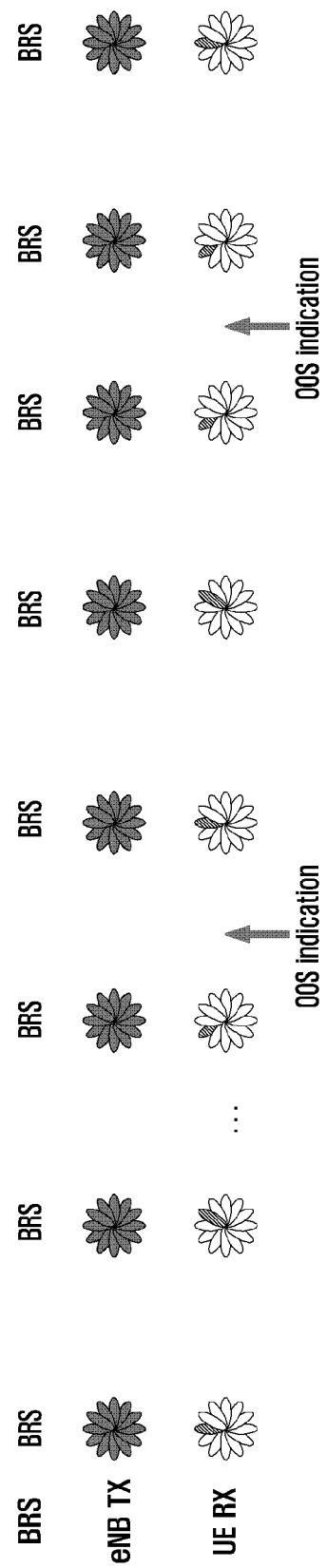
FIG. 13 is a diagram illustrating a case of a non-overlapping periodic measurement.

FIG. 13 shows a case of a non-overlapping periodic measurement.

As described above, the OOS/IS indication may be delivered to a higher layer periodically by the unit of time with no overlapping. In this case, if no corresponding event occurs, no indication may be sent.

Figure 14:
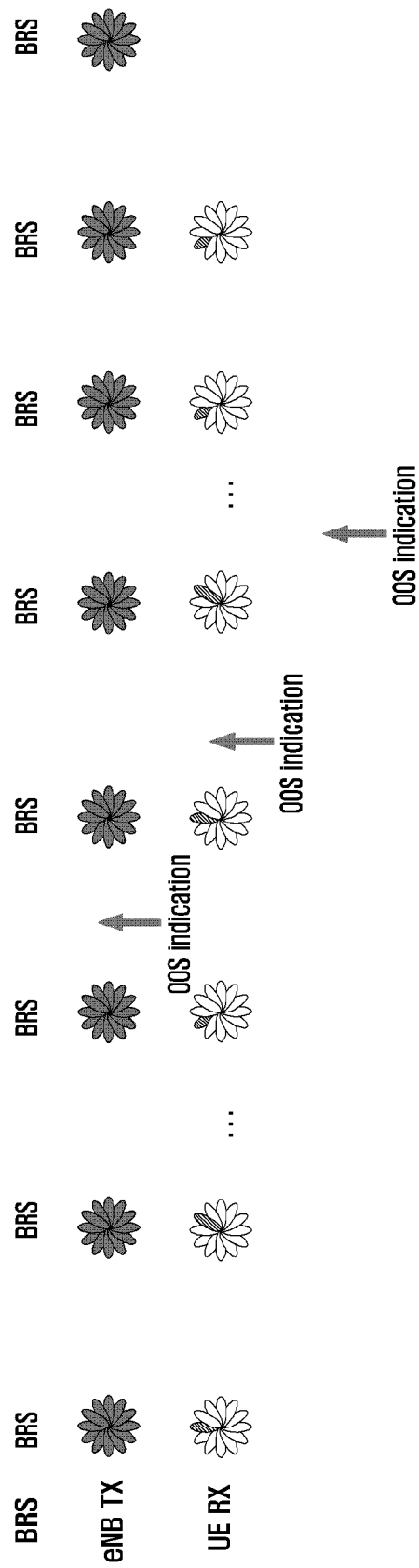
FIG. 14 is a diagram illustrating a case of an overlapping periodic measurement.

FIG. 14 shows a case of an overlapping periodic measurement.

In consideration of the time regions that are regularly overlapped in the form of a sliding window, the OOS/IS may be indicated. That is, if a measurement results from a certain TX-RX beam pair, the above-described methods A to H of Case 1 may be applied with the values updated with the TX-RX beam pair measurement values that belonged to the old terms. Likewise, if no corresponding event occurs, no indication may be sent to the higher layer.

As another condition, if a number of specific RA attempts made during a predetermined time period is greater than a given value, this is used for making an RLF decision. Because a beam mismatch triggers an RA, if the beam mismatch occurs frequently during a predetermined time period, this triggers RLF decision-making. Here, the specific RA may be an RA being attempted when the beam tracking has failed rather than the RA for timing alignment or handover.

Figure 15:
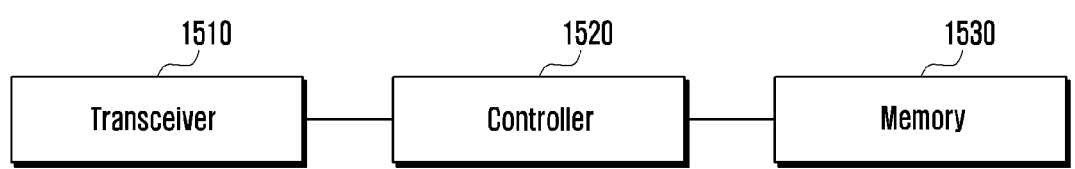
FIG. 15 is a block diagram illustrating a configuration of a terminal according to an embodiment of the present invention.

FIG. 15 is a block diagram illustrating a configuration of a terminal according to an embodiment of the present invention.

As shown in FIG. 15, the terminal may include a transceiver 1510, a controller 1520, and a storage unit 1530. In the present invention, the controller may be defined as a circuit, an application-specific integrated circuit, or at least one processor.

The transceiver 1510 may transmit and receive signals to and from other network entities. For example, the transceiver 1510 may receive system information and synchronization and reference signals from a base station.

The controller 1520 may control overall operations of the terminal according to an embodiment of the disclosure. For example, the controller 1520 may control signal flows among the function blocks to perform the operations described with reference to the accompanying drawings. For example, the controller 1520 may be configured to identify an OOS or IS on multiple RX beams, start, if it identifies the OOS, a timer for determining an RLF, and hold the timer upon a request for beam switching to at least one of the multiple RX beams.

The storage unit 1530 may store at least one of information being transmitted/received by the transceiver 1510 and information generated by the controller 1520.

In the embodiments of the present invention, the components are described in singular or plural form depending on the embodiment. However, the singular and plural forms are selected appropriately for the proposed situation just for explanatory convenience without any intention of limiting the present invention thereto; thus, the singular form includes the plural form as well, unless the context clearly indicates otherwise.

Although the description has been made with reference to particular embodiments, the present invention can be implemented with various modifications without departing from the scope of the present invention. Thus, the present invention is not limited to the particular embodiments disclosed, and it will include the following claims and their equivalents.

The invention claimed is:

1. A method performed by a terminal in a wireless communication system, the method comprising:
    identifying an out-of-synchronization (OOS) indication or an in-synchronization (IS) indication of multiple received beams;
    starting a timer, in case that the OOS indication is identified;
    holding the timer, in case that a switch of at least one of the multiple received beams is requested;
    resuming the timer, in case that the switch of the at least one of the multiple received beams is completed; and
    stopping and resetting the timer, in case that the IS indication is identified,
    wherein the OOS indication is identified, in case that all of the multiple received beams are in an OOS state, and the IS indication is identified, in case that at least one of the multiple received beams is in an IS state.

2. The method of claim 1, further comprising declaring a radio link failure (RLF), in case that the timer is expired.

3. The method of claim 1, further comprising declaring a radio link failure (RLF), in case that the switch of the at least one of the multiple received beams is failed.

4. The method of claim 1, wherein the request of the switch comprises transmitting a dedicated preamble of a scheduling request (SR) to a base station.

5. The method of claim 1, wherein the request of the switch comprises transmitting a random access channel (RACH) preamble to a base station.

6. A terminal in a wireless communication system, the terminal comprising:
    a transceiver; and
    a controller configured to:
        identify an out-of-synchronization (OOS) indication or in-synchronization (IS) indication of multiple received beams,
        start a timer, in case that the OOS indication is identified,
        hold the timer, in case that a switch of at least one of the multiple received beams is requested,
        resume the timer, in case that a switch of the at least one of the multiple received beams is completed, and
        stop and reset the timer, in case that the IS indication is identified,
    wherein the OOS indication is identified, in case that all of the multiple received beams are in an OOS state, and the IS indication is identified, in case that at least one of the multiple received beams is in an IS state.

7. The terminal of claim 6, wherein the controller is configured to declare a radio link failure (RLF), in case that the timer is expired.

8. The terminal of claim 6, wherein the controller is configured to declare a radio link failure (RLF), in case that the switch of the at least one of the multiple received beams is failed.

9. The terminal of claim 6, wherein the controller is configured to transmit, to a base station by the transceiver, a dedicated preamble of a scheduling request (SR) or a random access channel (RACH) preamble to for the request of the switch.

* * * * *